United States Patent
Spall et al.

(10) Patent No.: US 12,162,405 B2
(45) Date of Patent: *Dec. 10, 2024

(54) DIGITAL LICENSE PLATE WITH ACTIVE RESPONSE TO NARROWBAND LICENSE PLATE RECOGNITION

(71) Applicant: ReviverMx, Inc., Foster City, CA (US)

(72) Inventors: John Michael Spall, San Ramon, CA (US); Matthias Thomas Peter Pfeiffer, Boulder, CO (US)

(73) Assignee: ReviverMx, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,983

(22) Filed: Oct. 2, 2023

(65) Prior Publication Data

US 2024/0025339 A1 Jan. 25, 2024

Related U.S. Application Data

(63) Continuation of application No. 17/360,816, filed on Jun. 28, 2021, now Pat. No. 11,801,787.

(51) Int. Cl.
| | |
|---|---|
| *B60Q 1/56* | (2006.01) |
| *B60Q 1/26* | (2006.01) |
| *B60Q 1/50* | (2006.01) |
| *B60R 13/10* | (2006.01) |

(52) U.S. Cl.
CPC ............. *B60Q 1/56* (2013.01); *B60Q 1/2603* (2013.01); *B60Q 1/503* (2013.01); *B60R 13/10* (2013.01); *B60Q 2900/30* (2013.01)

(58) Field of Classification Search
CPC .... B60Q 2900/30; B60Q 1/56; B60Q 1/2603; B60Q 1/503; B60R 13/10
See application file for complete search history.

(56) References Cited

U.S. PATENT DOCUMENTS

| | | | |
|---|---|---|---|
| 9,615,430 B2 * | 4/2017 | Meritt .................. | H05B 47/105 |
| 10,259,404 B2 * | 4/2019 | Findlay ................. | B60R 13/105 |
| 10,981,496 B2 * | 4/2021 | Schaye .................. | B60Q 1/268 |
| 11,132,554 B2 * | 9/2021 | Johnson ................ | G06V 20/63 |
| 11,192,495 B2 * | 12/2021 | Elli ........................ | H04L 12/40 |

* cited by examiner

*Primary Examiner* — Arman B Fallahkhair
(74) *Attorney, Agent, or Firm* — Innovent Law, PC; Karima Gulick

(57) ABSTRACT

A digital license plate includes a display system capable of showing a license number readable by camera systems even under poor external lighting conditions. A light redistribution element is positioned near the display system and a lighting system is positioned to direct light from the light redistribution element and toward the display system. In some embodiments the lighting system includes a narrowband lighting element such as can be provided by a narrowband light source, and the display system includes an electrophoretic or LCD display.

20 Claims, 12 Drawing Sheets

1200

DIGITAL LICENSE PLATE WITH ACTIVE RESPONSE TO NARROWBAND LICENSE PLATE RECOGNITION

CROSS-REFERENCE TO RELATED APPLICATION

This application incorporates by reference and claims the benefit of priority to U.S. Utility application Ser. No. 17/360,816 filed on Jun. 28, 2021.

TECHNICAL FIELD

The present disclosure relates to vehicle mounted exterior displays, and more specifically to digital license plates using narrowband light to improve optical pattern recognition by roadside camera systems.

BACKGROUND

Law enforcement, security organizations, or tolling organizations are using digital license plate recognition systems based on cameras, with image analysis to detect the presence of a license plate object in the image and optical character recognition to read the registration number. To avoid glare and interference with other light sources, reading of the license plate can be performed at non-visible wavelengths, including infrared and ultraviolet. Advantageously, this allows license plate reading and recognition to happen without disturbing people with distracting light flashes detectable by the human eye. Camera systems for this purpose are usually fitted with infrared light sources which may be for example infrared LED sources that illuminate the scene in which a license plate may be read. As the position of the license plate is variable a relatively large scene needs to be illuminated with infrared or UV wavelengths, and even then, only a small area of the license plate reflects useful light back to the camera requiring very sensitive high-resolution cameras.

Standard metal license plates can have a retroreflective coating that improves light reflection from external artificial light sources. When light hits the surface of the retroreflective coating, a significant portion of the light gets reflected towards to source over a wide angle of incidence range, unlike a mirror surface where the reflection back towards the source happens only if the light impinges onto the surface at normal incidence. However, despite the retroreflective property of such a license plate the amount of light returned to the camera is barely enough for reliable detection of the license plate number under variety of environmental conditions. Current camera systems can have a correct recognition rate as low as 50 to 60% under certain environmental conditions, leading to loss of revenue in tolling systems and missed opportunities in law enforcement.

Problems with reading digital license plates using current camera systems are even greater. Digital license plates based on electronic displays generally cannot work with a retroreflective surface, and other options to steer the impinging light back towards the source are limited in efficacy. For example, a digital license plate based on an electronic paper display is a near Lambertian reflector that reflects light diffusely with a fairly wide (Gaussian) intensity distribution with a peak at an angle equal but opposite to the angel of the incident light. In another example, a digital license plate based on a liquid crystal display has a diffuse reflector and an additional optional diffuser which may have a narrower reflected light distribution or an engineered reflected light distribution e.g. "a top hat distribution". While such diffusers can steer the light into direction other than "exit angle is equal but opposite incidence angle", such directional diffusers typically have a fixed direction with respect to the display. Unfortunately, license plate recognition systems may have to be positioned to view the digital license plate from many different directions, including directions that are not preferred by a directional diffuser. As a result, the amount of light returned to a license plate detection system camera from a digital license plate can be considerably lower than the amount of light that would have been returned from a retroreflective metal plate in the same position and under the same illumination conditions. Less available returned light increases the image signal to noise ratio and decreases accuracy and repeatability of license plate pattern recognition and reading. Accordingly, systems and methods that improve an ability to read digital license plates using camera systems and associated license plate recognition and reading systems are needed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
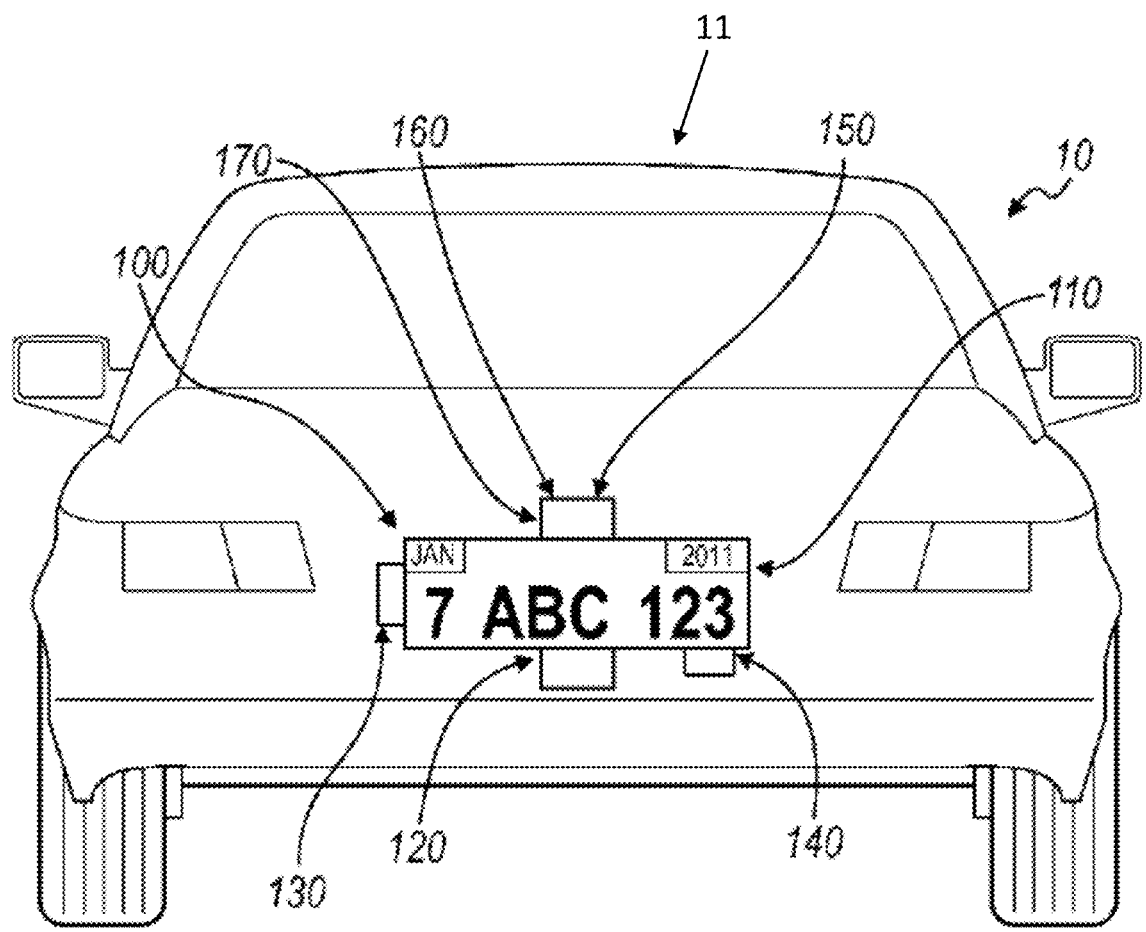
FIG. 1 illustrates one embodiment of a digital license plate system.

FIG. 1 illustrates one embodiment of a digital license plate system 11 supporting a dynamic display that presents vehicle identification and registration information and can be arranged on an exterior of a vehicle 10. The system 10 includes a display system 100 for use on the exterior of a vehicle 10, which includes a display 110, a vehicle speed sensor 120, and a processor 130 coupled to the vehicle speed sensor 120. The processor 130 is configured to implement one of three operational modes of the display system 100 based on the speed and state of the vehicle 10: a first operational mode, wherein a first content, including identification information of the vehicle 10 and/or registration information of the vehicle 10 is rendered on the display 110 at a first power consumption level; a second operational mode, wherein a second content, including a message, identification information of the vehicle 10, and/or registration information of the vehicle 10, is rendered on the display 110; and a third operational mode, wherein content is rendered on the display 110 at a second power consumption level less than the first power consumption level. The display system 100 preferably also includes a communication device 140 that allows content (for example, updated identification information, registration information, and/or messages) to be transferred to and from the display system 100. The display system 100 may also include a location sensor 160, for example, a Global Positioning System (GPS) device, a cellular tower location triangulation device, or any other suitable location sensor that determines the location of the vehicle 10 on which the display 110 is arranged. The location sensor 160 may provide a substantially general location or a substantially exact location of the vehicle. Additionally, the display system 100 may include a storage device 150 that functions to store content; the processor 130 may retrieve content from the storage device 150 and render it on the display 110. The display system 100 may further comprise a sensor 170 that determines the proximity of the vehicle 10 to a second vehicle.

The digital license plate system 11 is preferably used for registered vehicles such as personal cars, trucks, motorcycles, rental cars, corporately-owned cars, or any other suitable type of vehicle. The display system 100 functions to render identification and/or registration information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GPS device), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an electrophoretic display (e.g. an e-ink or related display), an organic LED display, an interferometric modulator display (iMoD), a display that uses electrophoretic deposition (EPD), a cholesteric liquid crystal display (ChLCDs), or any other suitable display, including bistable or effectively bistable displays that can include some types of LCD or electrophoretic displays. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However, the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be combined with a light source to more effectively illuminate the display 110, for example, the transreflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type, including but not limited to GPS aided speed sensing.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven (or, in other words, the ignition is on). The vehicle 10 may be considered "off" otherwise. In the "off" state, certain portions of the vehicle may still be "on", for example, security sensors, key proximity sensors (such as keyless entry), or any other type of substantially-low-power functionality. Alternatively, the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In a first example, the backlight of the display 110 may be at the lowest light intensity in the third mode. In a second example, in the variation of the display 110 that is electrophoretic based, lighting of the display 110 may be turned off, since such electrophoretic displays do not require additional power to maintain the image or be visible. The method and arrangement to decrease the power consumption of the display 110 in the third operational mode is preferably one of the two above variations, but may alternatively be a combination of the above variations or any other suitable method or arrangement.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GPS location device or accesses GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle 170 functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). Alternatively, the camera may be configured to determine directly the demographic of the driver of the second vehicle (for example, by matching the driver to a specific ethnicity by with facial recognition software) or the response of the driver of the second vehicle to a message rendered on the display 120. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
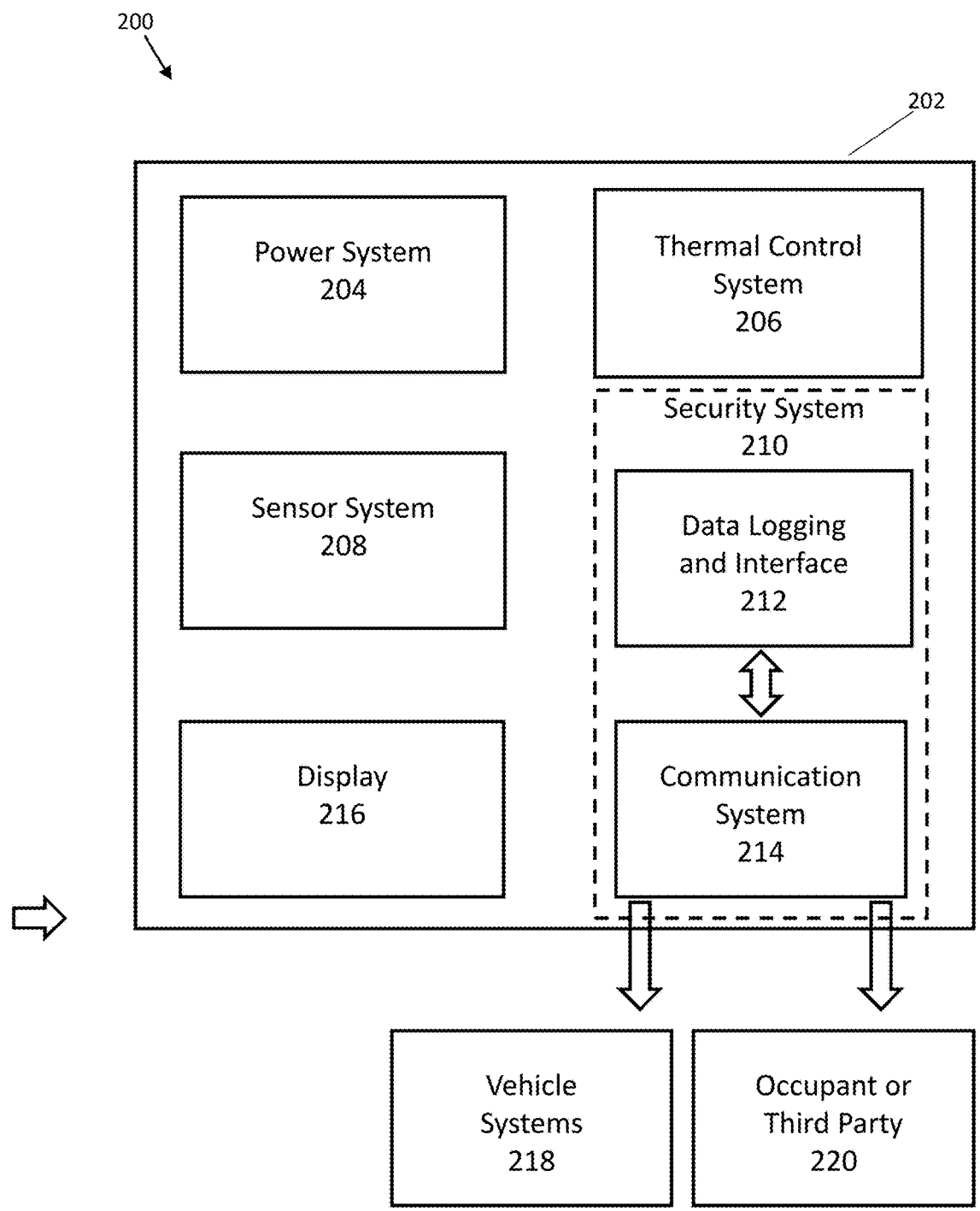
FIG. 2 illustrates various systems in a digital license plate system.

FIG. 2 illustrates various systems, sub-systems, or modules that can be incorporated into a digital license plate system 200, along potential interacting agents such as vehicle systems 218, vehicle occupants, or third party persons or automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216.

Figure 3:
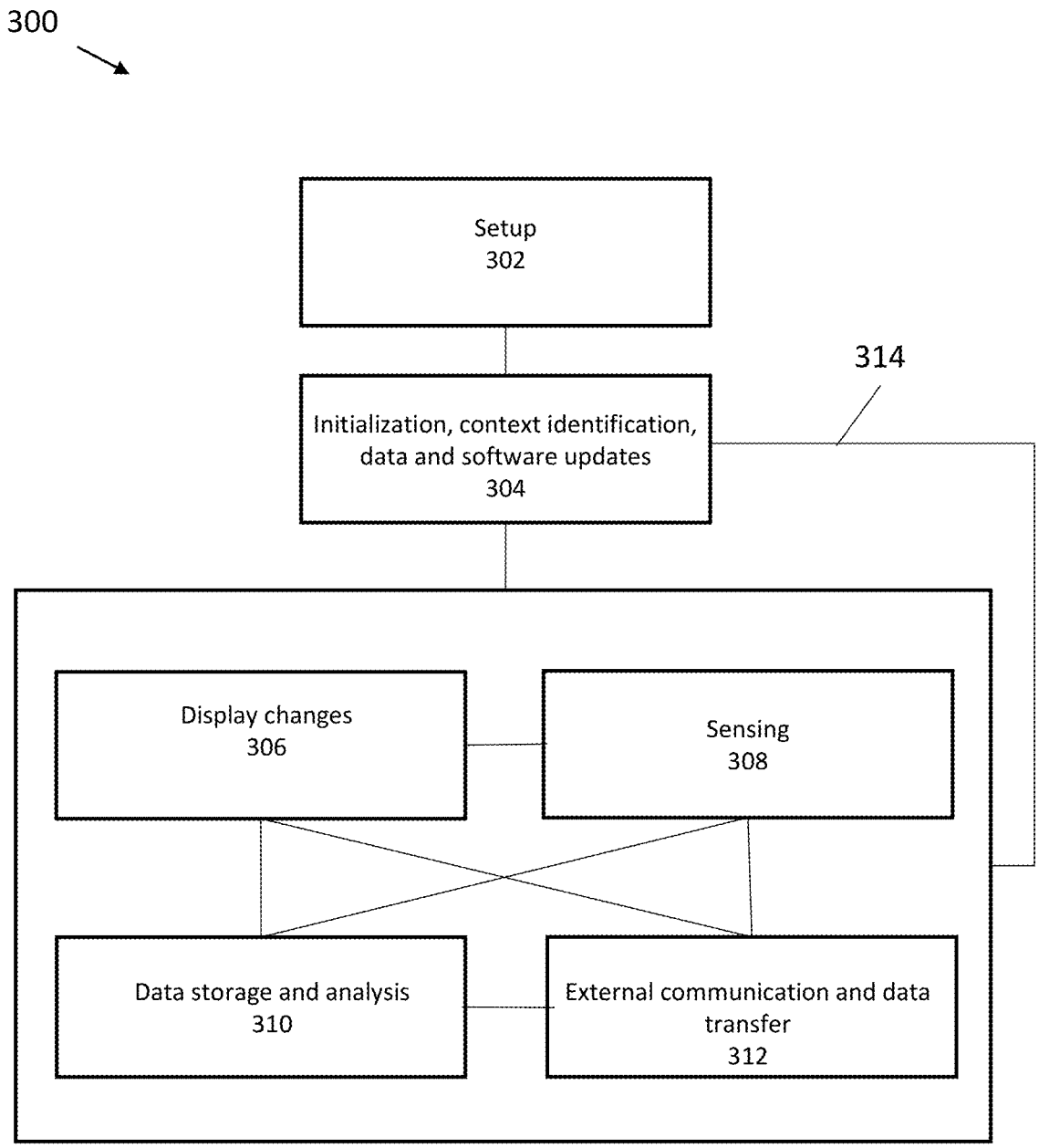
FIG. 3 illustrates operation of a digital license plate system.

FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304.

Figure 4:
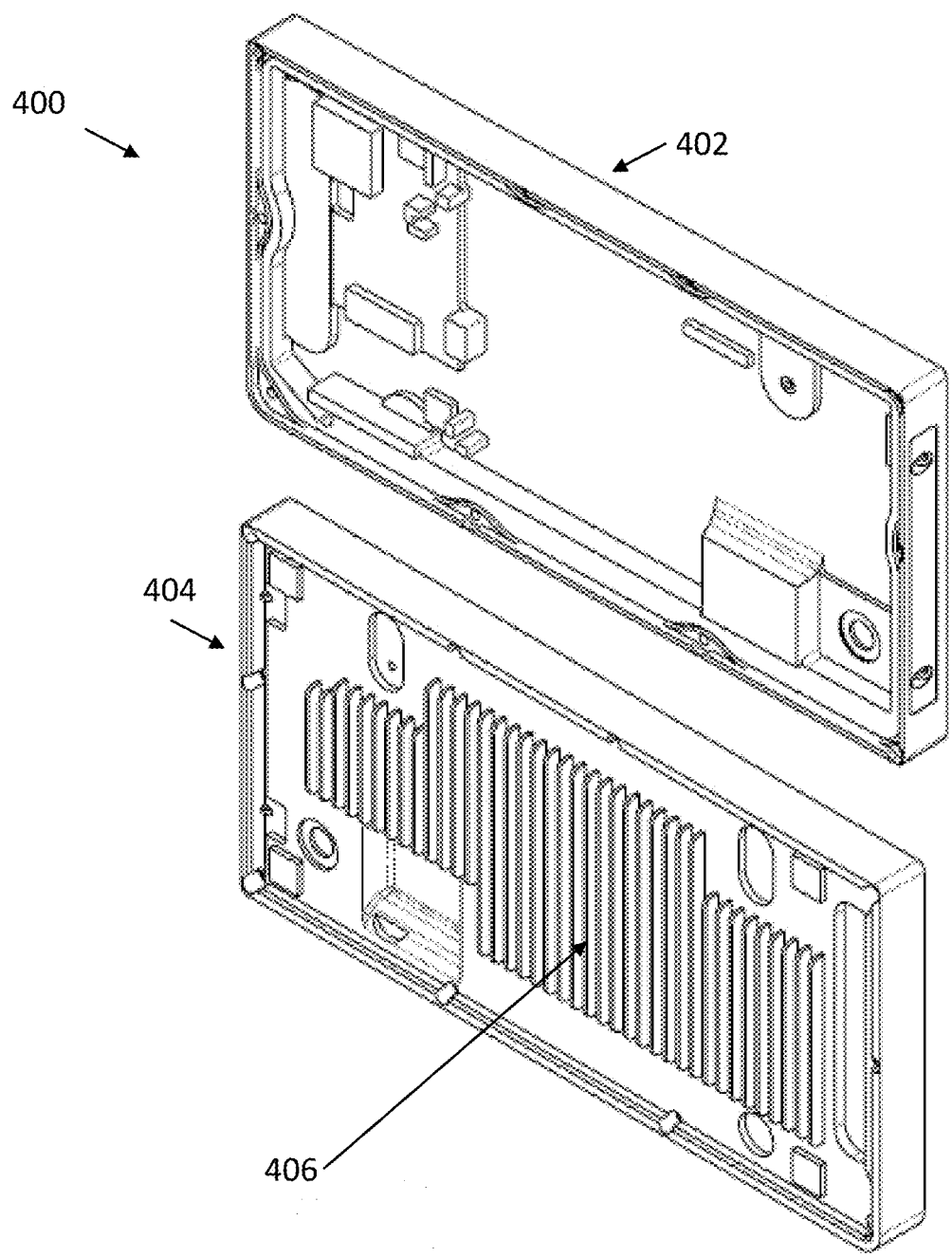
FIG. 4 depicts two views of a bezel.

FIG. 4 depicts two views 400 of a bezel, illustrating cooling fins. The view 400 in FIG. 4 shows a bezel 402 that functions as a frame surrounding digital display 110. 404 is an alternate view of bezel 402, showing a set of cooling fins 406. Cooling fins 406 function to radiate heat away from digital display 110, thereby helping reduce the heating rate associated with digital display 110.

In some embodiments, heat conduits may be included as a part of bezel 402, where heat conduits contact circuit board components directly to funnel heat away, and may also include some sort of heat-transfer compound (possibly in the form of a gel or paste) to help with heat conduction. Other embodiments may use thermoelectric cooling (e.g. Peltier devices) to provide active cooling for display system 110.

A suitable thermal control system such as discussed briefly with respect to FIG. 2 is also useful for ensuring reliable operation under a range of conditions. As discussed with respect to FIG. 1, display system 100 may be mounted on the exterior of a vehicle, and may be subject to a range of temperatures. Furthermore, display system 100 generates heat due to power dissipation in the associated components such as display 110. In some conditions, it might be important to prevent display system 100 from overheating. One strategy to regulate the amount of heat generated is to reduce the brightness of display 110 in accordance with the detected temperature associated with display system 100.

In some embodiments, digital display 110 may be a display that operates within a temperature range. Under low operating temperatures, a display may need to be externally heated for the display to correctly transition. Under high operating temperatures, there can be difficulties in switching unless the display is maintained below a defined temperature, or at least temporarily cooled. Due to the differences in the operating temperatures of electrophoretic displays and other displays such as those based on LCDs, temperature controls can be specific to display type. Performance of such displays can be improved for digital license plates such as discussed herein. For example, to improve readability, white pigment particles can be formed from, or associated with, materials that reflect infrared light. This improves readability using infrared sensitive camera systems. In another embodiment, for improved twilight or low light readability, the white pigment particles can be formed from, or associated with, materials that fluoresce or are phosphorescent. In still other embodiments, the white pigment particles can be formed from, or associated with, heat rejecting or heat absorbing materials that reduce or increase temperature to help maintain the display of the digital license plate within operational temperature limits.

Under low operating temperatures, a display may need to be externally heated for the display to correctly transition, since the lower bound of its operating temperature range may be lower than the operating range of the display medium employed therein, e.g. the liquid crystal or the particle suspension. Attached heating elements, heating pipes, battery or vehicle powered heating elements can all be used to ensure that the display is maintained or temporarily brought above the minimum display switching temperature when switching is required. Use of a heating element allows, for example, activation of a heater to bring the display above the minimum display switching temperature, followed by deactivation of the heater and consequent drop in temperature below the minimum display switching temperature. Other components that might be heated other than the display may include any associated circuit boards, and the battery system.

For embodiments without associated heaters (or when the heater does not generate sufficient heat to compensate for cold temperatures), operation of the display can be adjusted to compensate. For example, in one embodiment, as temperature is reduced near to a lower operational temperature limit, the digital license plate can be set to display only the legally required information. Advertisements that could interfere with display of legally required information or dynamic displays that could partially or completely fail to switch due to cold temperatures would not be allowed. In effect, for example, a vehicle maintained in a heated garage would be able to display the full range of visual effects possible in the digital license plate. If the vehicle moves into an environment with sub-zero temperatures, a temperature sensor could provide warning data of low temperature conditions, the digital license plate would switch to a display of only the legally required information or information that would not interfere with viewing of the legally required information. Similarly, embodiments that with active or passive cooling systems can support methods to ensure that the digital license plate will switch to a display of only the legally required information or information that would not interfere with viewing of the legally required information before temperatures reach a maximum display switching temperature.

Critical temperatures vary according to material and type of display. For example, an electrophoretic display may have a normal operating temperature range above 0 degrees Celsius and below 50 degrees Celsius. Actions to compensate for low or high heat conditions can begin before a critical temperature is reached. For example, a display pattern that impacts reflectivity can be adjusted to increase reflectivity as the sensed temperature increases above 40 degrees Celsius. Optional cooling elements can be activated if the temperature continues to increase, and the display can be locked into a non-switching state if temperature continues to rise, with the digital license plate acting to display only the legally required information or information that would not interfere with viewing of the legally required information. Similarly, at low temperatures, display pattern (reflectivity) can be adjusted to decrease reflectivity (i.e. increase absorption) as the sensed temperature decreases below 10 degrees Celsius. Optional heating elements can be activated if the temperature continues to decrease, and the display can be locked into a non-switching state if temperature continues to fall, with the digital license plate acting to display only the legally required information or information that would not interfere with viewing of the legally required information. Typically, actions taken to compensate for high or low heat conditions begin within 15, 10, or 5 degrees Celsius of the critical temperature, and can be ordered so that actions requiring little or no power or having a low visual impact are implemented before actions requiring a substantial amount of power or having a greater impact on display messaging are implemented.

As will be understood, temperature of a display can be directly or indirectly measured. Electronic thermometers with associated temperature control modules can be attached to the display, attached near or in the vicinity of the display, or attached somewhere on a vehicle. Ambient temperatures can be measured, and an indirect determination of likely display temperature can be made. In certain embodiments, predicted temperatures can be used. For example, if the digital license plate receives predicted or calculated overnight temperature information, protective measures can be immediately engaged when the vehicle is parked near the end of a day. While not as accurate as direct measurement of the display temperature, ambient or other indirect temperature measurement can be accurate enough to engage protective measures when needed as critical temperatures are approached.

In one embodiment, a display system supporting modifiable heat relevant display parameters includes a temperature sensor positioned to measure temperature of the display system. A temperature control module can be connected to the temperature sensor and configured to modify heat relevant display parameters as critical temperatures are approached. Modifiable heat relevant display parameter includes brightness, with brightness being increased as critical low temperatures are approached and decreased as critical high temperatures are approached. In another embodiment, the modifiable heat relevant display parameter includes a displayed pattern to modify reflectivity, with the displayed pattern being modified to increase heat absorption as critical low temperatures are approached and modified to decrease heat absorption as critical high temperatures are approached.

In some embodiments, displays can include multiple sub-displays formed from electrophoretic displays, LCD displays, or both electrophoretic and LCD displays. In some embodiments, a display may be comprised of sub-displays of similar or different kinds tiled together. Displays can be configured to display different media content. For example, an outer frame display may be configured to display vehicle license and registration information, while other sub-displays may display different advertising and/or promotional messages. In one embodiment, sub-display could be, for example, a color LCD or OLED display able to accurately display a replica of a colored annual registration sticker. In other embodiments, outer frame display and sub-display may be comprised of different display kinds. For example, outer frame display may be an electrophoretic display, a central sub-display may be an OLED display, another sub-display may be an LCD display, and a further sub-display can be another electrophoretic display.

Measures to prevent display and sub-display system from damage from road debris or similar hazards may include physical protective covers made from, for example, Plexiglas or sapphire crystal. Hydrophobic coatings may also be applied to the exterior surface of display system to prevent damage due to exposure to liquids such as water. In other embodiments, self-cleaning glass using nanocrystalline titanium dioxide coatings, plasma-chemical roughening, photocatalytic cleaning structures, molded polymeric layers, or other suitable hydrophobic or hydrophilic system can be used. Thermal protection can be provided by an IR-blocking coating. The display system may also be integrated into the vehicle structure itself. For example, a curved or flexible display may be used to conform aesthetically to a vehicle design. An embodiment of display system 100 may, for example, be conformably integrated into a bumper of a vehicle.

Figure 5:
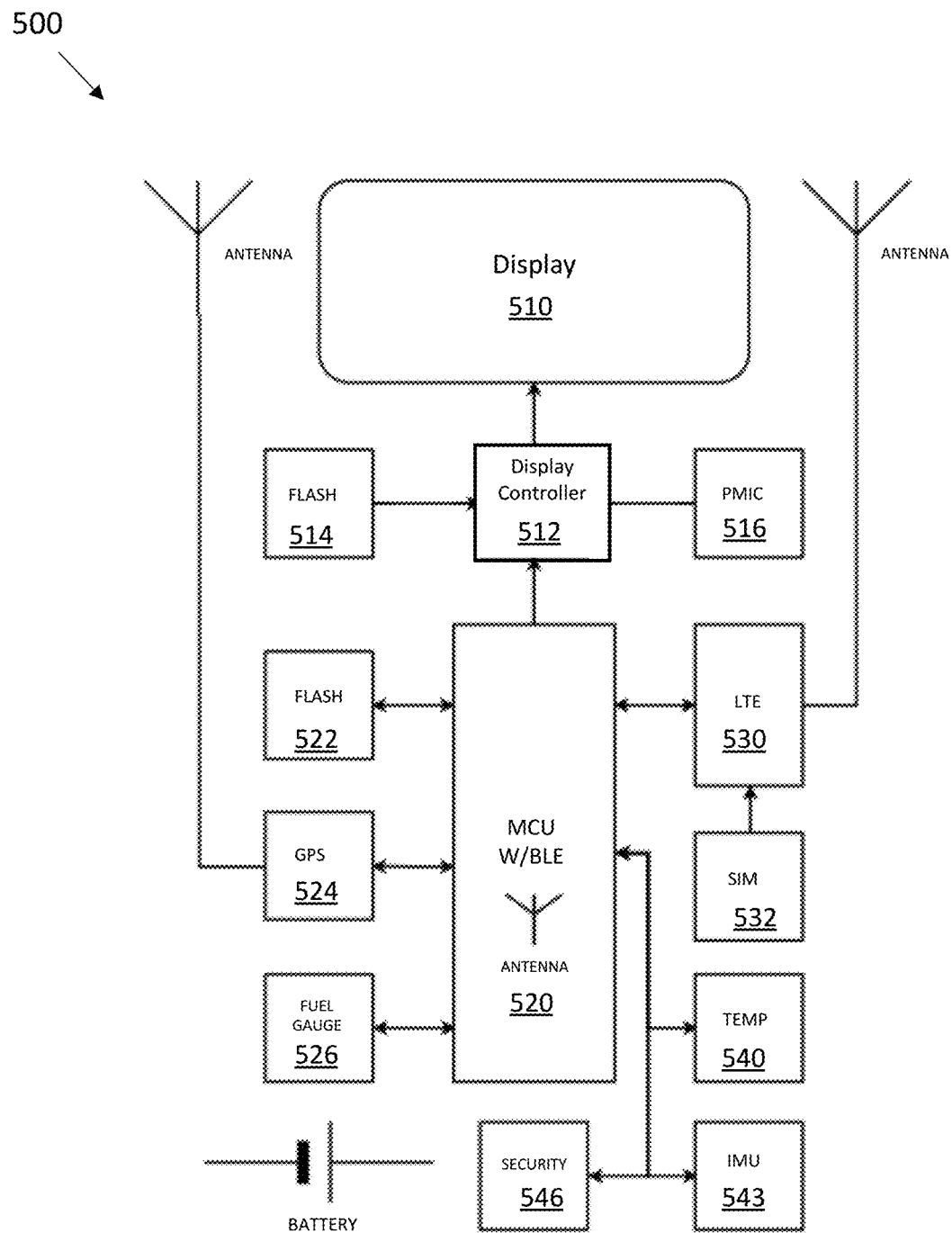
FIG. 5 illustrates an alternative digital license plate system.

FIG. 5 is an alternative embodiment of a digital license plate system 500 including a display 510 and display controller 512. The display controller 512 is connected to flash memory 514 for storing status and image related data, and a power management integrated circuit 516 to control and measure power provided to the display 510. The display controller 512 is connected to a master control unit 520 (MCU) for processing various communication, sensing, and control activities of the system 500. Connected modules include flash memory 522, GPS 524, fuel gauge 526, temperature sensor 540, inertial measurement unit 543, and security/antitheft monitors, sensors and locks 546. Communication can be provided by an LTE wireless system 530 using an associated SIM card 532.

FIGS. 6A, 6B, 6C, and FIGS. 7-10 describe digital license plates that can include a display system capable of showing a license number readable by camera systems even under poor external lighting conditions. A light source and light redistribution element are positioned near the display system to enable direction of light from the light redistribution element toward the display system. In some embodiments the lighting source(s) include a non-visible lighting element such as can be provided by an infrared or UV source, and the display system includes an electrophoretic or LCD display. In some embodiments, a digital license plate can be illuminated by artificial light sources of various types and wavelengths. These can include but are not limited to broadband light sources that emit visible, infrared, or UV light, as well as narrowband light sources that can emit selected ranges of visible, infrared, UV light, with various combinations of wavelengths being useful. In some embodiments, broadband light sources can be positioned to direct some or all emitted light through narrowband filters.

Commonly used light sources can be CCFL tubes, electroluminescent films, organic light emitting diodes or solid-state light emitting diodes (LED). In some embodiments solid-state light emitting diodes LEDs can be formed on sapphire or silicon carbide. In some embodiments semiconductor materials capable of forming high-brightness light emitting devices can include, but are not limited to, Group III-V semiconductors, particularly binary, ternary, and quaternary alloys of gallium, aluminum, indium, and nitrogen, also referred to as III-nitride materials. In certain embodiment, laser light emitting elements can be used.

Color of emitted light from the LED can be modified using a phosphor contained in glass, or as a pre-formed sintered ceramic phosphor, which can include one or more wavelength converting materials able to create white light or monochromatic light of other colors. All or only a portion of the light emitted by the LED may be converted by the wavelength converting material of the phosphor. Direction of light emitted from each LED can be modified by optics. Optics can be a single optical element or multiple optical elements. Optical elements can include converging or diverging lenses, aspherical lens, Fresnel lens, or graded index lens, for example. Other optical elements such as mirrors, beam diffusers, filters, masks, apertures, collimators, or light waveguides are also included. Optics can be positioned at a distance from the LED in order to receive and redirect light from multiple LEDs. Alternatively, optics can be set adjacent to each LED element to guide, focus, or defocus emitted light.

In some embodiments, one or more light sources can be directed in a light redistribution plate that can include a diffuser or light guide system that spreads light over a defined illumination area using multiple reflections, total internal reflection, or light diffusion. Such light redistribution plates can include separate or combined diffusers or light guide plates that can be formed from polycarbonate, polyethylene, polymethyl methacrylate (PMMA), or other suitable transparent or translucent polymeric materials. In some embodiments where a light guide plate is a component of a light redistribution plate that acts as an illuminator for a display, the light guide plate can be positioned to laterally receive LED light through an edge and redirect it to exit from a top or bottom surface. The light guide plate can be provided with different features that impart directionality on the light emitted from light source. Those features may include the shape of the light guide plate, shape of dots printed on the light guide plate, prisms or grooves that are molded or etched on the light guide, and/or random surface roughening. In some embodiments, dots may redirect incident light in a diffusive/directional manner to achieve a desirable light distribution pattern. In some implementations, dots may be printed with ink using screen printing and/or any other suitable printing technique. Additionally, or alternatively, the dots may be epoxy-based or silicone-based and contain diffusing particles. Depending on the desired light distribution pattern, dots or features can be regularly, semi-randomly, or randomly ordered. For example, in some embodiments, patterns can include increasing dot density away from an edge.

In some embodiments the light guide may be a slate, slab, or rectangular shaped object formed of a transparent or translucent material. The slate may have a plurality of edges, and two surfaces. In some embodiments the light guide features can have slanted side edges. In other embodiments, thickness of the light guide plate can vary. In some embodiments, multiple sides are available for edge or lateral injection of light into the light guide plate. Rectangular, square, ellipsoid, or circular light guide plates can be used.

Lighting systems can include necessary circuitry so as to enable the operation of the plurality of LEDs. LED circuit boards can include the necessary circuitry so as to enable individual or grouped operation of the plurality LEDs. In some embodiments, each LED can be separately controlled by controller, while in other embodiments groups of LEDs can be controlled as a block. In still other embodiments, both single LEDs and groups of LEDs can be controlled for selective activation or intensity.

Illumination such provided by external light sources or light guide plates can be directed to reflect, transmit, or reflect and transmit through a display. Electrophoretic, reflective LCD, or transmissive LCD displays can be illuminated with visible, infrared, or UV light. Advantageously this allows illumination with infrared, UV, or other non-visible light and provides an enhanced ability to read the digital license plate using infrared, UV, or other non-visible light.

Figure 6A:
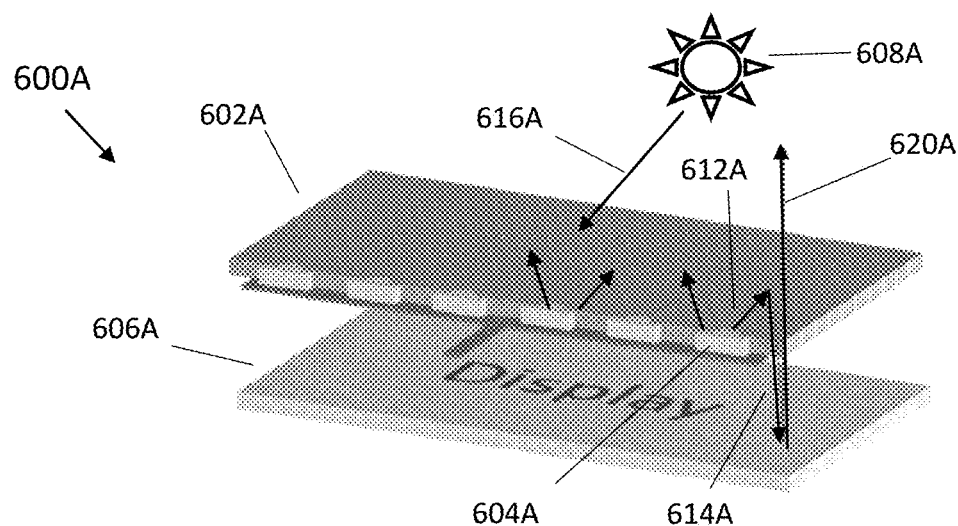
FIG. 6A illustrates front lighting system for a digital license plate.

FIG. 6A illustrates a vehicle front lighting system 600A for a digital license plate that includes infrared lighting of a display. More specifically, system 600A includes light redistribution plate that includes a light guide plate illuminator 602A and edge mounted LEDs 604A. At least some of the LEDs 604A provide infrared illumination. Light provided by the illuminator 602A is directed against the display 606A. In operation of one embodiment, infrared light 612A emitted from LED 604A is introduced into the illuminator 602A and after internal reflection, reflection, scattering, or diffusion is directed as light 614A to strike display 606A. Some portion of that light is reflected back through the illuminator 602A (e.g. light 620A) and can be received by an infrared camera system and associated license plate recognition and reading system (not shown).

Alternatively, or in addition, a vehicle mounted infrared light 608A can provide infrared lighting able to pass through the illuminator 602A. In some embodiments, the illuminator 602A can be omitted, and infrared light from light 608A used to directly illuminate a display 606A. In some embodiments, operation of the vehicle mounted infrared light 608A can be controlled by the digital license plate. The vehicle mounted infrared light 608A may be mounted outside the digital license plate such that it illuminates the entirety of display 606A. Alternatively, multiple infrared lights can be used that together illuminate some or all of the display. For example, one or more infrared light sources may be mounted on the vehicle at or near the location where currently visible light sources are legally required. Alternatively, or in addition, light sources emitting both visible and suitable infrared light may be used. A communication system may be provided as part of the digital license plate that can direct the vehicle system to turn on, and optionally turn off, the license plate illumination upon a suitable trigger event. Such trigger can be transmitted through digital communication through a conductor or through wireless communication inside a vehicle, use a magnetic field generated by the license plate triggering a hall sensor or a reed relay in the vehicle, or any other suitable trigger system.

Figure 6B:
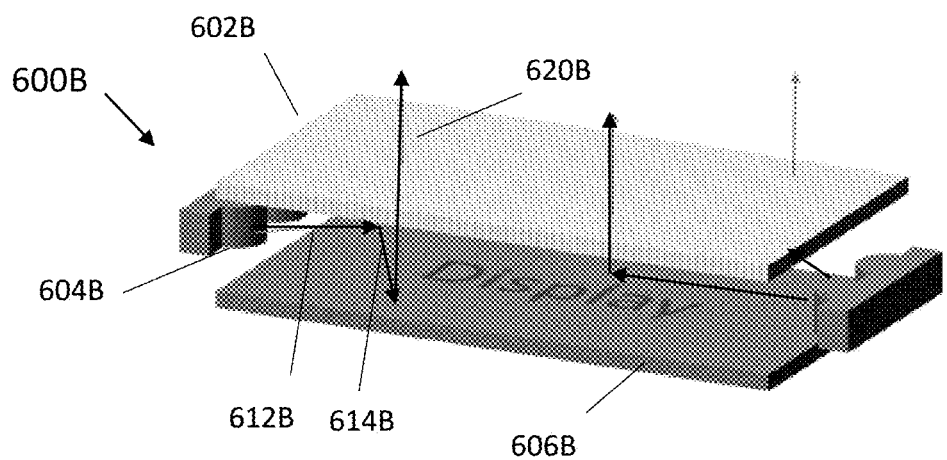
FIG. 6B illustrates a cavity mounted lighting system for a digital license plate.

FIG. 6B illustrates a cavity mounted lighting system 600B for a digital license plate. More specifically, system 600B includes a scattering or reflective illuminator 602B and LEDs 604B mounted in a cavity defined between illuminator 602B and LEDs 604B. At least some of the LEDs 604B provide infrared illumination. Light provided by the illuminator 602B is directed against the display 606B. In operation of one embodiment, infrared light 612A emitted from LED 604B is directed against the illuminator 602B and after reflection, scattering, or diffusion is directed as light 614B to strike display 606B. Some portion of that light is reflected by the display 606B, passes through the illuminator 602B (light 620B) and can be received by an infrared camera system and associated license plate recognition and reading system (not shown).

Figure 6C:
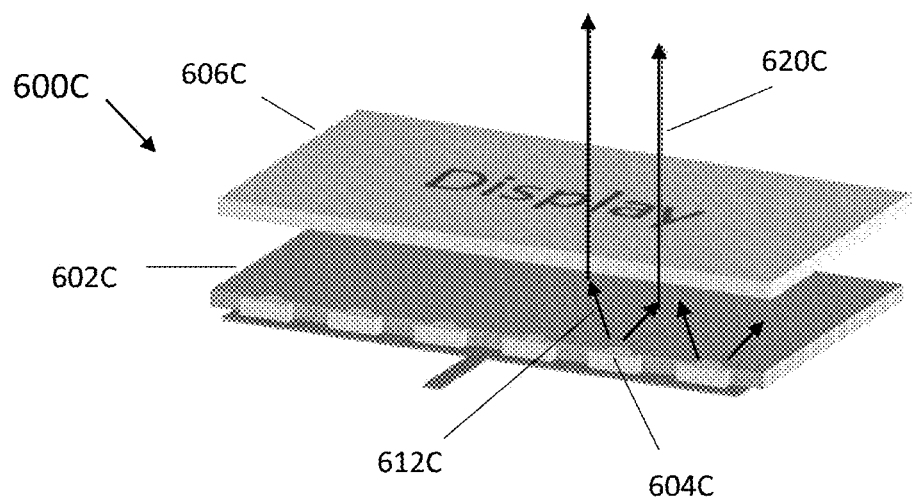
FIG. 6C illustrates a backlight lighting system for a digital license plate.

FIG. 6C illustrates a backlight lighting system 600C for a digital license plate. More specifically, system 600C includes a light guide plate illuminator 602C and edge mounted LEDs 604C. At least some of the LEDs 604C provide infrared illumination. Light provided by the illuminator 602C is directed against and at least partially transmitted through the display 606C. In operation of one embodiment, infrared light 612C emitted from LED 604C is introduced into the illuminator 602C and after internal reflection, reflection, scattering, or diffusion is directed to strike display 606C. Some portion of that light is transmitted through the display 606C (e.g. light 620C) and can be received by an infrared camera system and associated license plate recognition and reading system (not shown).

Figure 7:
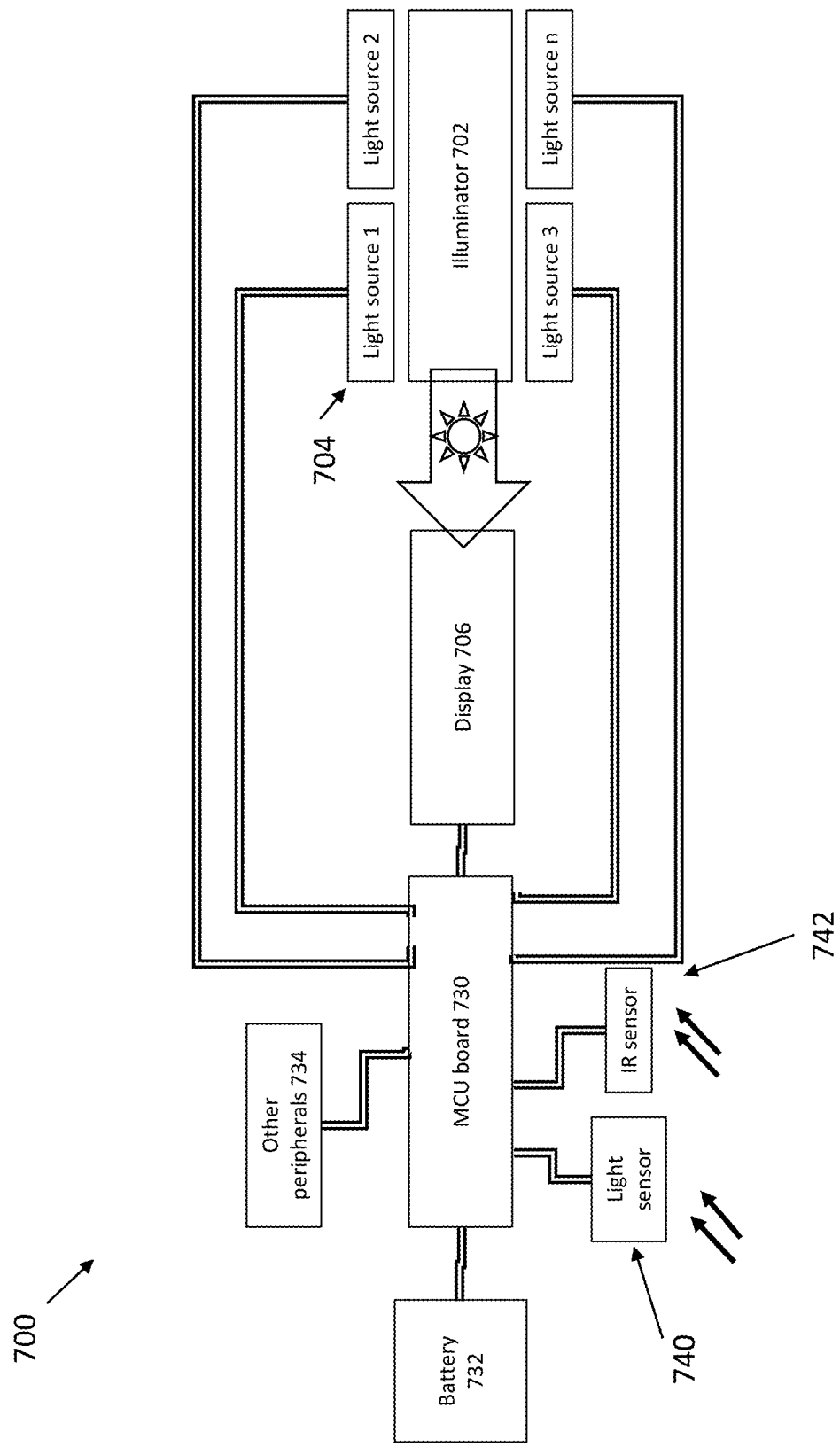
FIG. 7 illustrates a digital license plate with a light and an IR sensor.

FIG. 7 illustrates a digital license plate lighting system 700 with an illuminator 702 able to provide light redistribution and multiple light sources 704 that are used to illuminate a display 706. The light sources can be infrared only or both visible and infrared. Control and operation of the light sources 704 are provided by a MCU board 730 that is powered by a battery or other power source 732. The MCU board 730 can be connected to control other peripherals 734, and also provides control of a light sensor 740 and an IR sensor 742. Peripheral 734 can include communication systems such as radio beacons, radio beacons, radio receivers, GPS/GNSS based location systems, satellite systems or other suitable wireless receivers, transmitters, or receivers. In one embodiment, control of the lighting system 700 can use structures such as described with respect to FIGS. 6A, 6B, and 6C.

In operation of one embodiment, the lighting system 700 can be triggered by light or IR sensors to provide additional infrared illumination. Triggering can be done manually by a motorist, automatically based on time, or automatically based on light levels. In other embodiments, an externally positioned and limited range radio beacon (for example, located near a toll booth) can be used in conjunction with a radio receiver tuned to the beacon and able to trigger auxiliary infrared illumination. Another embodiment of this aspect can use a digital license plate with positional awareness such as a license plate having a GPS module and a map of the geographic area with toll booths or camera systems indicated. In some embodiments, to save energy, the infrared light sources can remain on for a predetermined period (e.g. 1 minute or 30 seconds) before turning off. Alternatively in some embodiments the infrared light sources can turn off upon a trigger such as a fast decrease of infrared light intensity, absence of signal from the radio beacon, upon leaving a predetermined geographic zone, or when traveling a predetermined distance.

Figure 8:
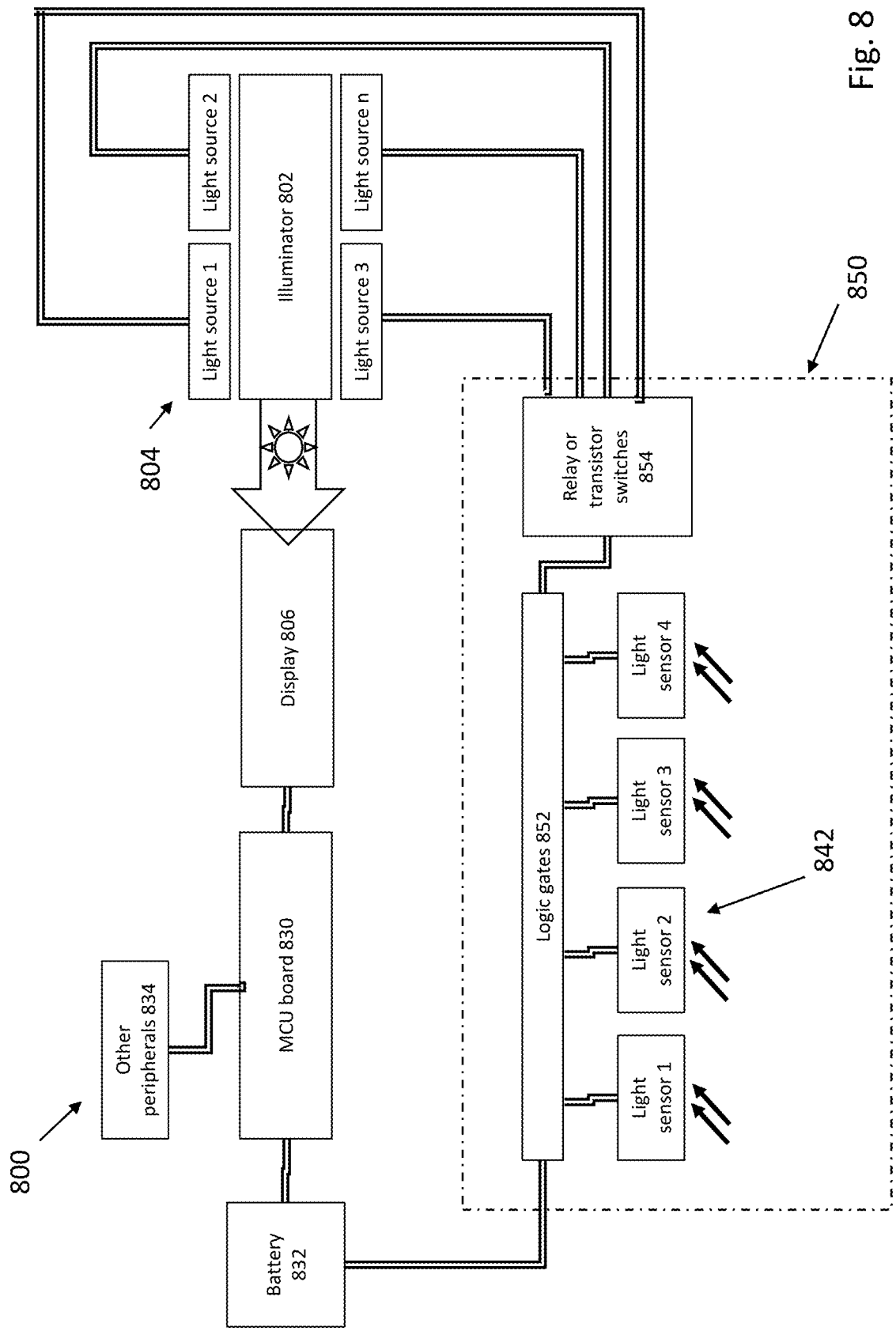
FIG. 8 illustrates a digital license plate with multiple light sensors.
Figure 9:
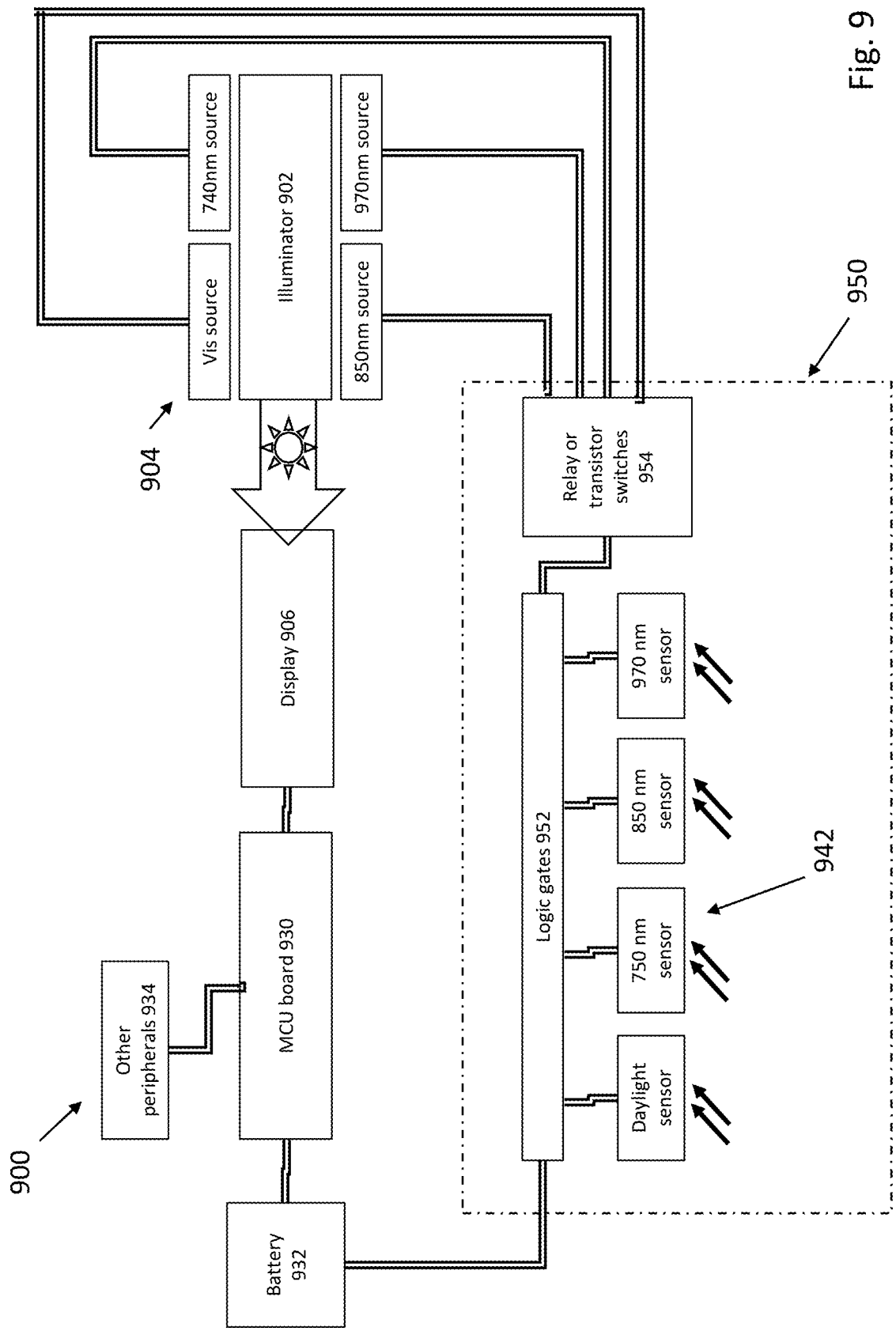
FIG. 9 illustrates a digital license plate with multiple wavelength specific light sensors.
Figure 10:
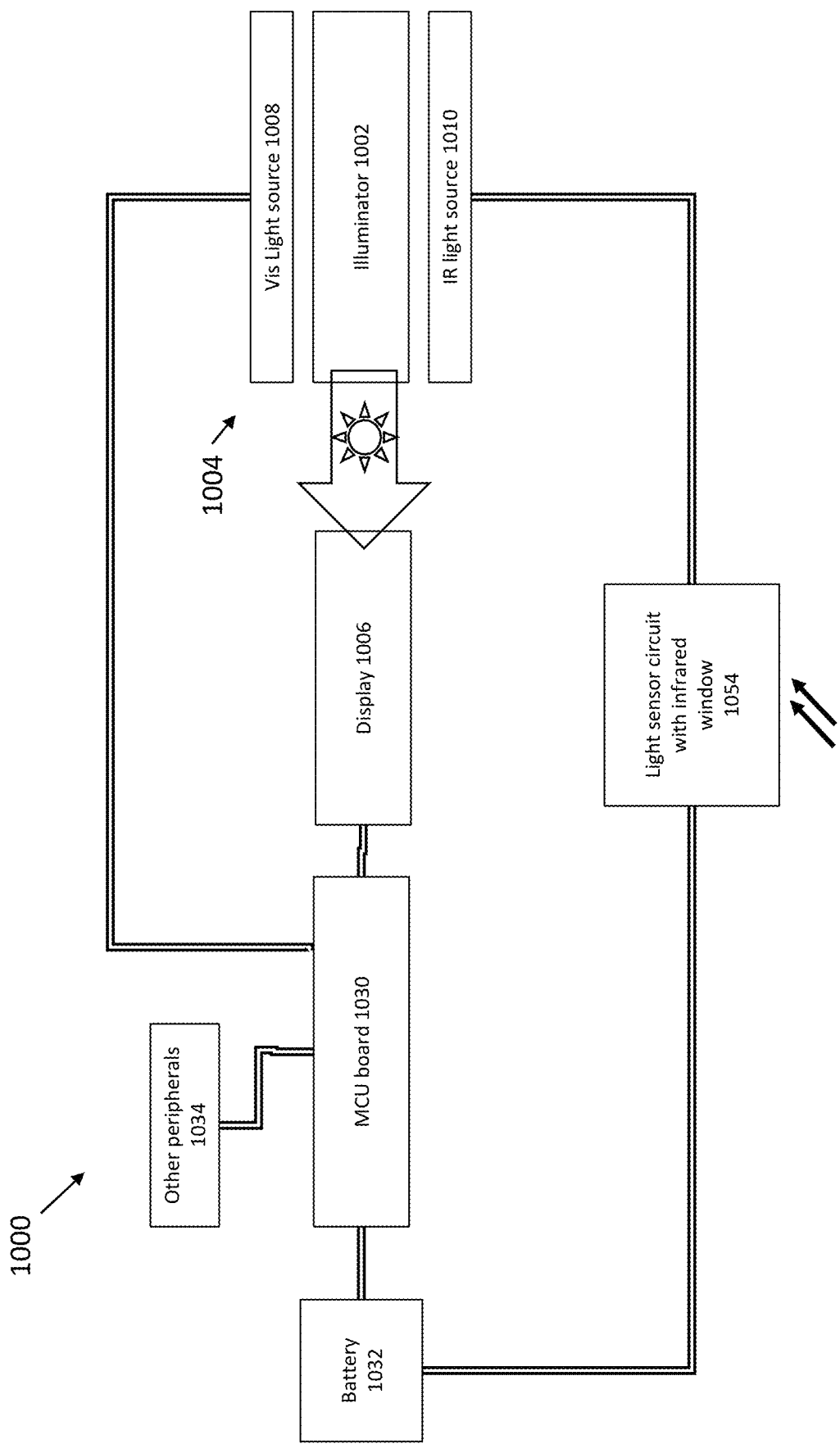
FIG. 10 illustrates a digital license plate including a photodiode with an infrared window.

In some embodiments the digital license plate can recognize a state of being read by an external camera system, and using light detector 740, IR sensor 742, the MCU board 730, and associated firmware to determine the operational response to being read. Typically, this would require the system 700 to wake up and respond. In another embodiment as illustrated in FIGS. 8, 9, and 10, the sensors and auxiliary illumination system can be provided in a separate digital or analog circuit, which can respond faster and does not require the extra power consumption of waking up the entire digital license plate system. This can provide, for example, an ability to remain in a low power sleep state at the time it is being read, for example when the vehicle is parked. A separate fast digital or analog system can be used to sense if the system 700 is being flashed with infrared light and respond with activation of the MCU board 730 and synchronized flashes of the auxiliary illumination system.

FIG. 8 illustrates a digital license plate with multiple light sensors. More specifically, FIG. 8 illustrates a digital license plate lighting system 800 with an illuminator 802 able to provide light redistribution and multiple light sources 804 that are used to illuminate a display 806. The light sources can be infrared only or both visible and infrared. Control and operation of the display 806 are provided by a MCU board 830 that is powered by a battery or other power source 832. The MCU board 830 can be connected to control or receive information from other peripherals 834. A separate analog or digital circuit 850 can be powered by a battery or other power source 832, which can be the same power source that powers the MCU board 830 or a separate power source. This separate analog or digital circuit can activate the light sources without the need to wake up the MCU board (which may be in a low power state), and hence can respond much faster to a trigger received by the light sensors 842. Multiple light sensors 842 work in conjunction with relay or transistor switches 854 and logic gates 852 to provides control of light sources 804. The circuit can be arranged such that light falling onto a certain combination of sensors will cause a certain combination of light sources to be activated. In some embodiments, light sensors can be distributed around the vehicle, including front, back, or side mounted light sensors, or sensors mounted on or near the digital license plate receiving light from different directions. Peripheral 834 can include communication systems such as radio beacons, radio beacons, radio receivers, GPS/GNSS based location systems, satellite systems or other suitable wireless receivers, transmitters, or receivers. In one embodiment, control of the lighting system 800 can use structures such as described with respect to FIGS. 6A, 6B, and 6C.

FIG. 9 illustrates a digital license plate with multiple wavelength specific light sensors. More specifically, FIG. 9 illustrates a digital license plate lighting system 900 with an illuminator 902 able to provide light redistribution and multiple light sources 904 that are used to illuminate a display 906. The light sources include both visible and infrared, with narrowband LEDs respectively providing 740 nm, 850 nm, and 970 nm, along with broadband visible light. Control and operation of the display 906 are provided by a MCU board 930 that is powered by a battery or other power source 932. The MCU board 930 can be connected to control or receive information from other peripherals 934. A separate analog or digital circuit 950 is powered by a battery or other power source 932, which can be the same power source that powers the MCU board 930 or a separate power source. This separate analog or digital circuit can activate the light sources without the need to wake up the MCU board (which may be in a low power state), and hence can respond much faster to a trigger received by the light sensors 942. Multiple light sensors 942 work in conjunction with relay or transistor switches 954 and logic gates 952 to provides control of light sources 904. The circuit can be arranged such that light falling onto a certain combination of sensors will cause a certain combination of light sources to be activated. The sensors can be selected to be sensitive to different wavelength bands of light, for example daylight, 750 nm, 850 nm and 970 nm light. Peripherals 934 can include communication systems such as radio beacons, radio beacons, radio receivers, GPS/GNSS based location systems, satellite systems or other suitable wireless receivers, transmitters, or receivers. In one embodiment, control of the lighting system 900 can use structures such as described with respect to FIGS. 6A, 6B, and 6C.

FIG. 10 illustrates a digital license plate including illumination with visible light controlled by the MCU board and illumination with infrared light controlled by a separate circuit sensitive only to infrared light. More specifically, FIG. 10 illustrates a digital license plate lighting system 1000 with an illuminator 1002 able to provide light redistribution and light sources 1004 that are used to illuminate a display 1006. The light sources include both visible and infrared light sources. Control and operation of the visible light sources 1008 are provided by a MCU board 1030 that is powered by a battery or other power source 1032. The MCU board 1030 can be connected to control or receive information from other peripherals 1034. Peripherals 1034 can include communication systems such as radio beacons, radio beacons, radio receivers, GPS/GNSS based location systems, satellite systems or other suitable wireless receivers, transmitters, or receivers and may include a daylight sensor. For example, the MCU board may use the input from the daylight sensor in combination with other information such as if the vehicle is on or off, or the speed of the vehicle to determine if the visible light sources should be activated and at what brightness. Alternatively, the MCU board may use its geographic location, time and date to determine the need to activate the visible light sources when vehicle state and speed warrants visible illumination. A separate, fast light sensor circuit with an infrared window 1054 is powered by a battery or other power source 1032, which can be the same power source that powers the MCU board 1030 or a separate power source. The light sensor circuit 1054, which has an infrared window designed such that it ignores any natural lighting controls the IR light sources 1010. In one embodiment, control of the lighting system 1000 can use structures such as described with respect to FIGS. 6A, 6B, and 6C.

In operation, the light sensor circuit with an infrared window 1054 has a sensitivity for light at wavelengths used for infrared illumination in license plate recognition systems. If sensor 1054 senses a fast change in intensity of light at such wavelengths it can cause the infrared light sources 1010 to be turned on. A fast change in infrared light intensity would occur when a license plate recognition system would flash its infrared illuminators to read the digital license plate. A fast change in infrared light would also occur when a vehicle drives into a zone illuminated by a constant intensity infrared light source or when another vehicle, e.g. a law enforcement vehicle, having a constant intensity infrared light source, drives by a license plate mounted to a stationary vehicle.

In some embodiments, a license plate having a IR wavelength sensitive detector or a light sensor circuit with an infrared window 1054 can be configured to determine wavelength of external IR illumination. For example, when a specific IR wavelength (e.g. with 850 nm or 750 nm) is detected, the license plate can respond by illuminating itself with the same wavelength that is used by the emitted IR of an interrogating license plate recognition system.

Figure 11:
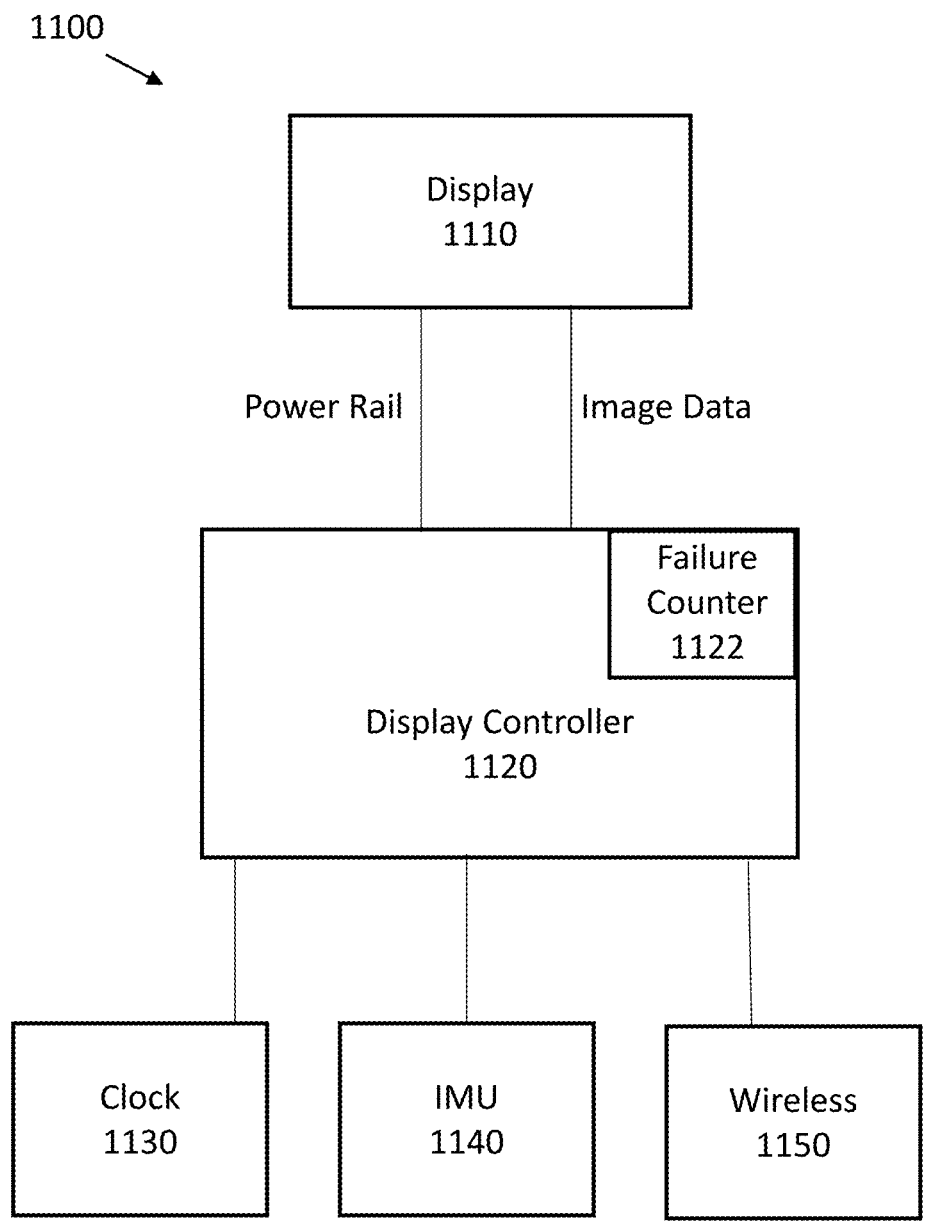
FIG. 11 illustrates an embodiment of a digital license plate with a display failure system.

FIG. 11 illustrates an embodiment of a digital license plate system 1100 with a display failure system. Such a system is particularly useful in conjunction with previously described displays 1110 that provided a license plate number. In many instances, a damaged display 1110 will still provide a recognizable image of, for example, a license plate number. Refreshing the display image prior to presenting a new image could result in a corrupted or unreadable license plate number.

In some embodiments, before electronic display update by display controller 1120 with new image data, impedance and/or current consumption of power rail(s) are measured for the display 1110. Based on defined "pass" criteria thresholds, an electronic display sequence is initiated; based on "fail" criteria thresholds, the display update sequence is aborted, retaining previous "pass" display image. Unique failures can be counted with a failure counter 1122 and are stored for tracking or troubleshooting purposes. Unique failures can also be associated with an inertial measurement unit 1140 (IMU) that can include a gyroscope, accelerometer or other motion related sensor able to sense possible impacts. Time of display failure or time of unusual motion related events can be determined using a real time clock 1130. This data can be sent using a wireless module 1150 to a user, server system, or cloud network. Based on received information, replacement digital licenses can be automatically ordered, warranty coverage determined, and failure modes understood.

Figure 12:
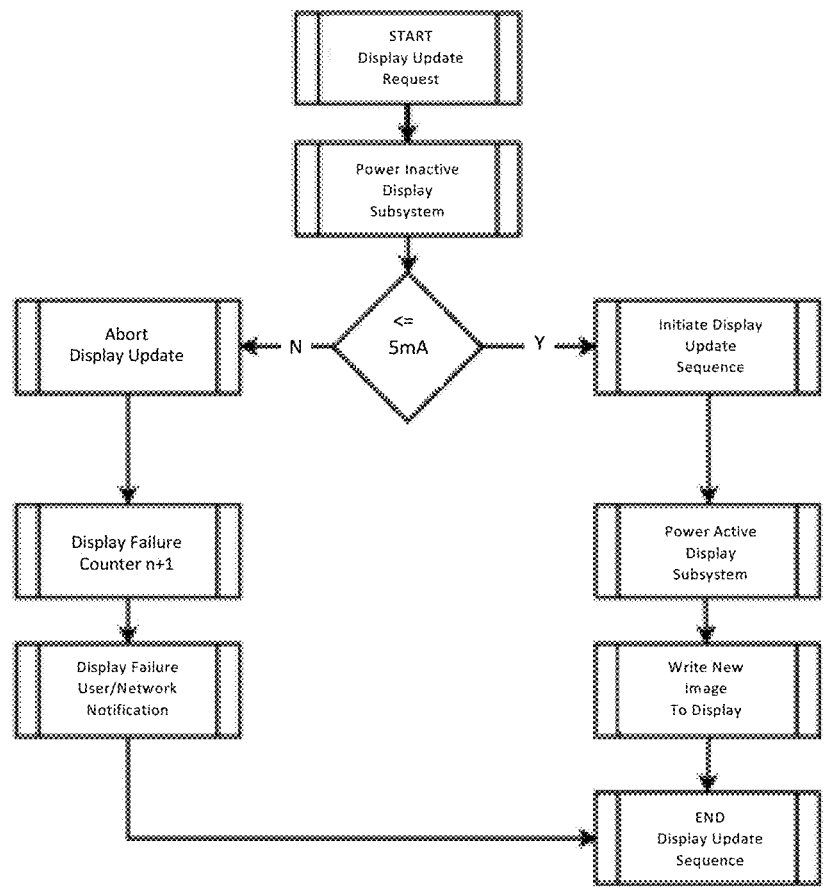
FIG. 12 illustrates one method for operating a display failure system.

FIG. 12 illustrates one method 1200 for operating a display failure system. A display update request is made to a power inactive display. Measurements of power draw or impedance are made, and if, for example, power draw is less than or equal to 5 mW the display update is aborted. A display failure counter is incremented, and notification can be provided to a user or cloud network of the failure, with the display update sequence ending. Alternatively, if measurements of power draw or impedance are made, and power draw is greater than 5 mW the display update is initiated, the display fully powered and readied for a new image write. After a successful write, the display update sequence ends.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A digital license plate comprising a dynamic display system configured to show a designated information using visible light; a lighting system comprising: at least one visible light source for generating the visible light of a broadband spectrum and a plurality of narrowband light sources for generating narrowband light of different wavelength than that of the at least one visible light source; a plurality of sensors respectively activates in response to a trigger signal of a particular wavelength; a controller connected to the sensors to receive the trigger signal and configured to activate the narrowband light source to generate narrowband light based on a combination of the sensors activated by the trigger signal; and a light redistribution element configured and positioned to receive the visible light from the visible light source and the narrowband light from the narrowband light source, the light redistribution element directs the visible and narrowband light toward the display system, a showing of the designated information is not disrupted by the narrowband light.

2. The digital license plate of claim 1, wherein the narrowband light source includes the visible light source and a narrowband filter configured to filter visible light from the visible light source.

3. The digital license plate of claim 1, wherein the narrowband light source is edge attached to the digital license plate in front of the display system.

4. The digital license plate of claim 1, wherein the narrowband light source is located between the light redistribution element and the display system.

5. The digital license plate of claim 1, wherein the narrowband light source is edge attached to the digital license plate behind the display system.

6. The digital license plate of claim 1, wherein the at least one narrowband light source is activated in response to a light sensor signal.

7. The digital license plate of claim 1, wherein the at least one narrowband light source is activated in response to a narrowband light sensor signal.

8. The digital license plate of claim 1, wherein the at least one narrowband light source is activated in response to a radio signal.

9. The digital license plate of claim 1, wherein the at least one narrowband light source is activated in response to the license plate entering a predetermined location.

10. The digital license plate of claim 1, wherein the at least one narrowband light source is deactivated some duration after activating in response to a light, infrared, radio signal, or location.

11. A method of operating a digital license plate, comprising:
    generating broadband visible light using at least one visible light source;
    displaying a designated information on a dynamic display system using the visible light;
    providing a plurality of narrowband light sources for generating narrowband light of different wavelength than that of the at least one visible light source;
    providing a plurality of sensors respectively activates in response to a trigger signal of a particular wavelength
    detecting the trigger signal using at least one of the sensors;
    activating one of the narrowband light sources to generate narrowband light based on a combination of the sensors activated by the trigger signal; and
    redistributing light by using a light redistribution element positioned to receive the visible and narrowband light and direct the visible and narrowband light toward the display system without disrupting a showing of the designated information.

12. The method of operating a digital license plate of claim 11, wherein the step of generating the narrowband light includes:
    activating one of the visible light sources to generate visible light; and
    directing the visible light to pass through a narrowband filter.

13. The method of operating a digital license plate of claim 11, further comprising attaching the narrowband light source to the digital license plate in front of the display system.

14. The method of operating a digital license plate of claim 11, further comprising positioning the narrowband light source between the light redistribution element and the display system.

15. The method of operating a digital license plate of claim 11, further comprising attaching the narrowband source to the digital license plate behind the display system.

16. The method of operating a digital license plate of claim 11, further comprising activating the narrowband light source in response to a light sensor signal.

17. The method of operating a digital license plate of claim 11, further comprising activating the narrowband light source in response to a radio signal.

18. The method of operating a digital license plate of claim 11, further comprising activating the narrowband light source in response to the license plate entering a predetermined location.

19. The method of operating a digital license plate of claim 11, further comprising deactivating the narrowband light source some duration after activating in response to a visible light, infrared, or radio signal.

20. The method of operating a digital license plate of claim 11, wherein the light redistribution element includes a diffuser configured to spread light over a defined illumination area.

* * * * *